Dec. 9, 1952     K. G. E. WICKBERG     2,620,907
SYNCHRONIZING DEVICE FOR TRANSMISSIONS
Filed Oct. 10, 1949     4 Sheets-Sheet 1

INVENTOR
Karl Gustaf Eugen Wickberg,
BY Wenderoth, Lind & Ponack
ATTORNEYS

Dec. 9, 1952 K. G. E. WICKBERG 2,620,907
SYNCHRONIZING DEVICE FOR TRANSMISSIONS
Filed Oct. 10, 1949 4 Sheets-Sheet 2

INVENTOR
Karl Gustaf Eugen Wickberg,

BY Wenderoth, Lind & Ponack
ATTORNEYS

Dec. 9, 1952 — K. G. E. WICKBERG — 2,620,907
SYNCHRONIZING DEVICE FOR TRANSMISSIONS
Filed Oct. 10, 1949 — 4 Sheets-Sheet 3

INVENTOR
Karl Gustaf Eugen Wickberg,
BY Wenderoth, Lind & Ponack
ATTORNEYS

Dec. 9, 1952 K. G. E. WICKBERG 2,620,907
SYNCHRONIZING DEVICE FOR TRANSMISSIONS
Filed Oct. 10, 1949 4 Sheets-Sheet 4

INVENTOR
Karl Gustaf Eugen Wickberg,

BY Wenderoth, Lind & Ponack
ATTORNEYS

UNITED STATES PATENT OFFICE 2,620,907

SYNCHRONIZING DEVICE FOR TRANSMISSIONS

Karl Gustaf Eugen Wickberg, Stocksund, Sweden

Application October 10, 1949, Serial No. 120,441
In Sweden October 11, 1948

8 Claims. (Cl. 192—.062)

The present invention relates to synchromesh transmissions and particularly to a synchronizing device for engaging various gears in constant-mesh gear transmissions, especially in connection with motor vehicles, and irrespective of whether, at the beginning of the shifting operation, the engine driven input shaft and its associated gears in the transmission case rotate at a lower or higher speed than the output or main shaft, at the intended point of engagement between the two shafts, the synchronization being obtained by varying the speed of the engine.

In synchronizing devices of hitherto known types synchromesh gear changing has been accomplished by braking or accelerating the rotary masses in the transmission case against the output or main shaft by means of any one of a plurality of friction devices until a speed will have been imparted thereto which corresponded to the speed of the output shaft. Such a device, however, particularly in its application to heavy vehicles involving necessarily comparatively large diameters, suffers from considerable disadvantages such as a relatively rapid wear down of the friction devices, which is one of the reasons why this known device has only been advantageously employed in low-weight vehicles such as passenger cars and the like.

Therefore, in the case of heavier vehicles, one has been confined, in changing down, at least, to the oldest way of accomplishing synchromesh which consists in double declutching in conjunction with foot accelerating the engine. This is carried out in the following manner: After declutching and placing the gearshift lever in neutral, the clutch pedal is released and the engine accelerated for which operation the vehicle operator is obliged to use his right foot. The clutch pedal is again depressed (declutching) when the operator estimates the rotating gears to be synchronized and thus capable of being connected with each other in synchromesh by moving the gearshift lever.

The attainment of an exactly defined synchromesh by this method, however, is entirely dependent on the operator's personal skill, and moreover the shifting is rather time-consuming and makes it impossible for the operator to operate the foot brake of the vehicle when a gear shifting operation is being performed. As a result of lacking synchromesh the operator most commonly has to change his gear forcibly which results in gear-clashing. When changing into a higher speed no serious difficulties have been experienced even in heavy vehicles, nor has any undue wear been involved, in that recent methods of shaping the gear teeth will have eliminated most of the problems in connection with gear-changing operations in this direction.

The present invention has for its objects to provide a synchronizing device which is reliable and sure of operation for both heavy and light-weight vehicles, and to avoid the necessity of operating the accelerator pedal in conjunction with double declutching, in that the accelerating means of the vehicle is arranged to be automatically actuated, in such instance, through the intermediary of any suitable other member partaking in the gear changing operation, and, as the case may be, to avoid the double declutching by causing the occasional operation of the engine clutch to be carried out automatically.

For the objects stated, according to the invention, a synchronizing device of the kind described is mainly characterized in combination by dog clutch means arranged between the respective speed gears of the transmission and being such as only to be capable of being engaged when both its clutch members rotate at the same speed, the engagement of said clutch members being prevented by a thrust member at least when the speed of the clutch member associated with the output shaft of the transmission is greater than the speed of the other clutch member, the angular position of said thrust member relative to one of said clutch members being dependent on the sense of rotation of the input shaft of the transmission relative to the output shaft thereof, auxiliary actuating means for the accelerating means of the engine cooperating with the gear shifting mechanism and/or engine clutching means upon changing down, and retaining or stop means cooperating with said actuating means, in such a manner that, after the engine clutch, following disengagement thereof in conjunction with placing the gearshift-lever in neutral, has been again occasionally engaged, either by releasing the clutch pedal or by an auxiliary clutch automatically engaged in the declutching position of said pedal, the engine is accelerated by moving the gearshift lever toward the new gear position and/or through continued movement of the clutch pedal, until synchronous speeds are attained at the point of engagement in the transmission, said auxiliary actuating means being arranged to be disabled automatically through said movement of said gearshift-lever toward the new gear position and/or through the operation of said main clutch in connection with the gear-shifting-operation.

Said thrust member, being suitably a disc, ring or sleeve, which is angularly displaceable between two limits and is formed with a number of radial projections or teeth peripherally cooperating with shoulders or teeth formed on one of the dog clutch members in order to prevent or permit, respectively, the engagement of the dog clutch, need not be a new part of the transmission, since a well-known thrust washer or spacer already present at the respective gear on the output shaft might be formed in such a manner that it may be adapted to serve simultaneously as said axial thrust member.

Since changing from a lower into a higher gear usually will not involve any material difficulties, as the speed difference at the point of engagement will rapidly decrease, the said thrust member is preferably arranged upon changing into a higher speed to occupy a position such that the interengagement of the dog clutch members will not be prevented thereby, in which case the clutch members are, or may be, provided with any suitable retarding means in order to facilitate the synchronization of the dog clutch member rotating with the input shaft and the masses rotating therewith with the other dog clutch member.

Two embodiments of the synchronizer according to the invention will now be described by way of example, reference being had to the accompanying drawings. It should be pointed out, however, that the invention is by no means restricted to exactly these embodiments which are to be considered as being merely illustrative, since the equivalent operation is obtainable in many different ways without departing from the inventive conception.

Figure 1:
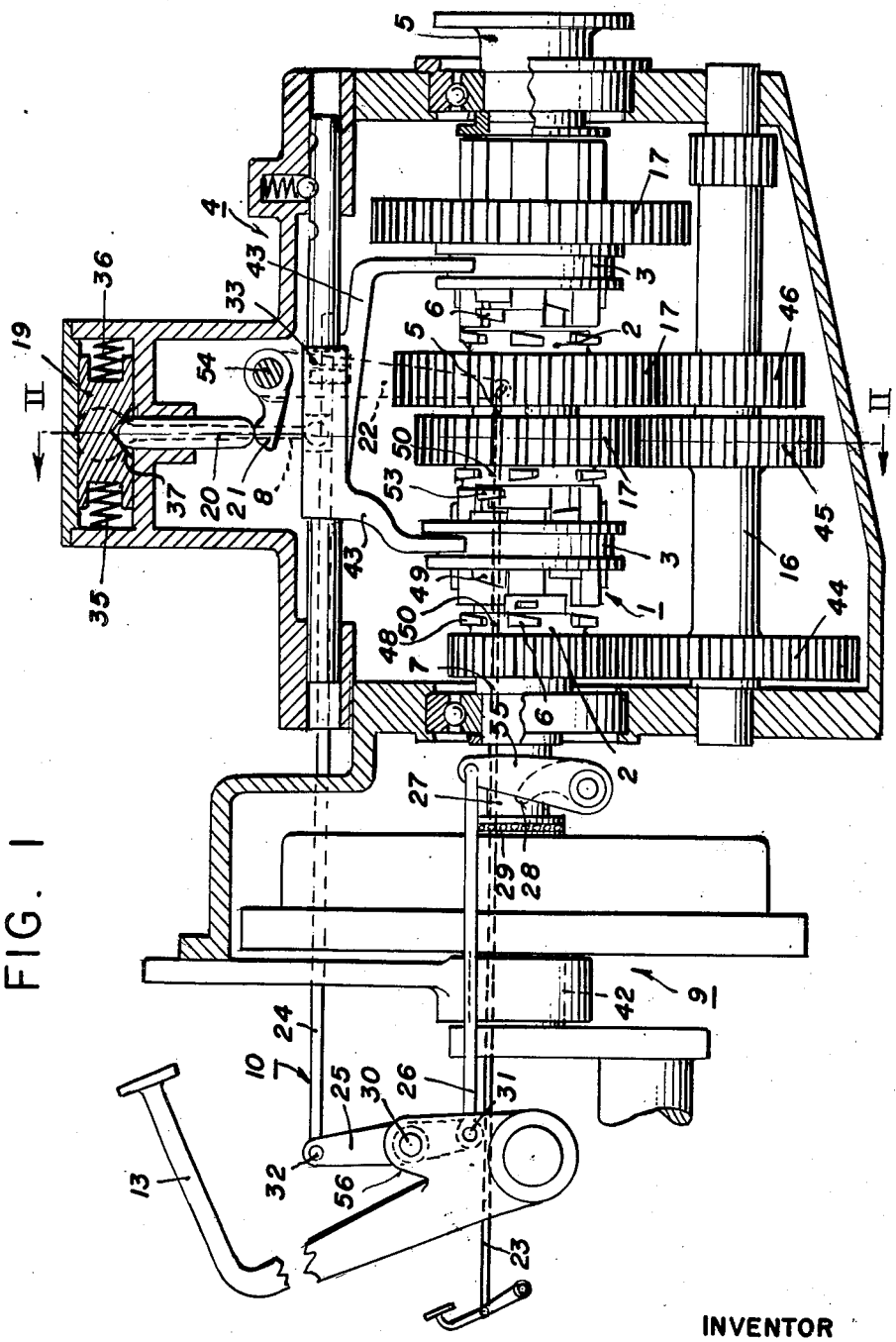
Fig. 1 is a side elevation, partly in section, of a constant-mesh transmission and a conventional engine clutch, in combination with a synchronizing device according to one embodiment of the invention.
Figure 2:
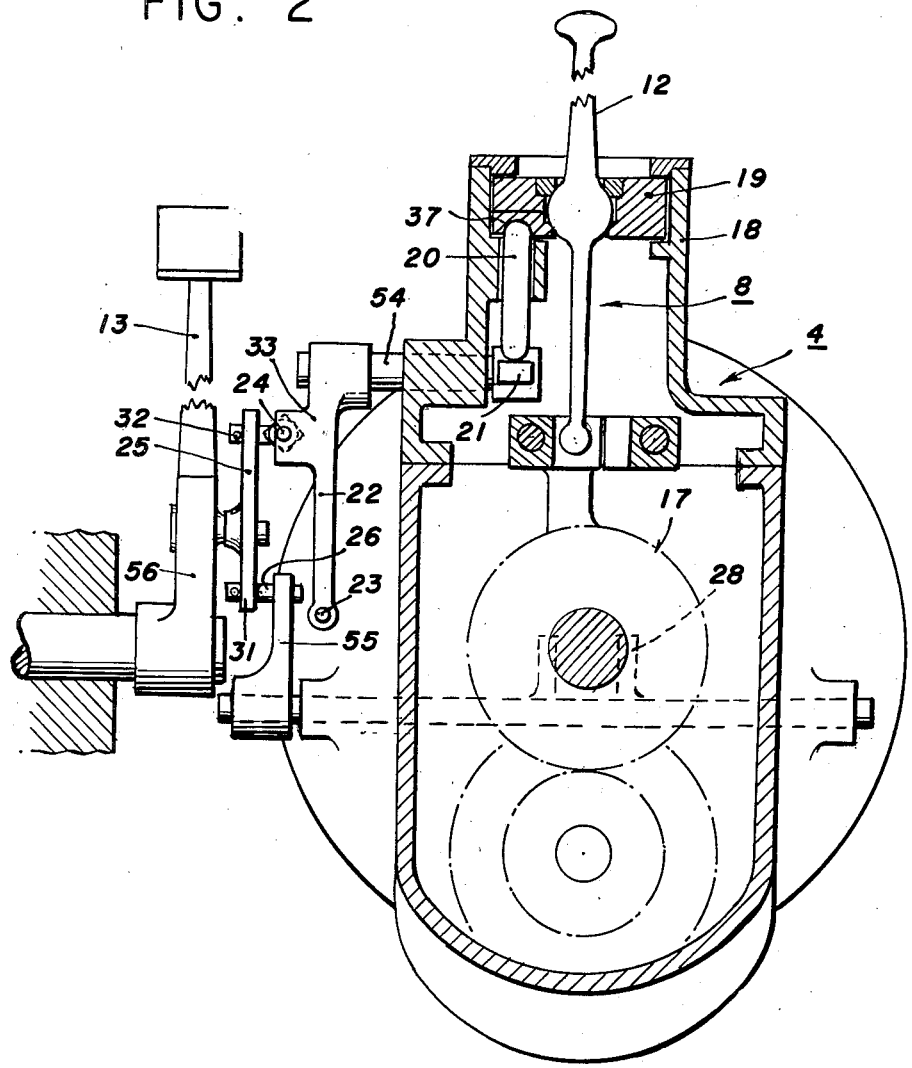
Fig. 2 is a vertical section and elevation taken along the lines II—II in Fig. 1.

Referring now to the embodiment illustrated in Figs. 1 and 2, numeral 42 designates the engine crankshaft which carries one member, viz. the flywheel, of a well-known friction main clutch or engine clutch 11 which belongs to the clutching mechanism 9 comprising also the clutch pedal 13, throwout fork 28, throwout bearing 29, and, within the clutch cover 11, the clutch springs and a clutch disc which is axially movable and non-rotatably mounted on the input shaft 7 of the transmission 4, and which is adapted to be pressed against the rear face of said flywheel by said clutch springs, and to be released therefrom by the clutch pedal 13 being depressed by the vehicle operator causing the throwout fork to displace the throwout bearing axially against the action of said clutch springs. In the clutching mechanism 9 there is always a certain amount of lost motion causing a play 27 normally to be present between the throwout fork 28 and throwout bearing 29. This play, according to this invention, may be utilized in a manner and for a purpose to be described further below.

Figure 3:
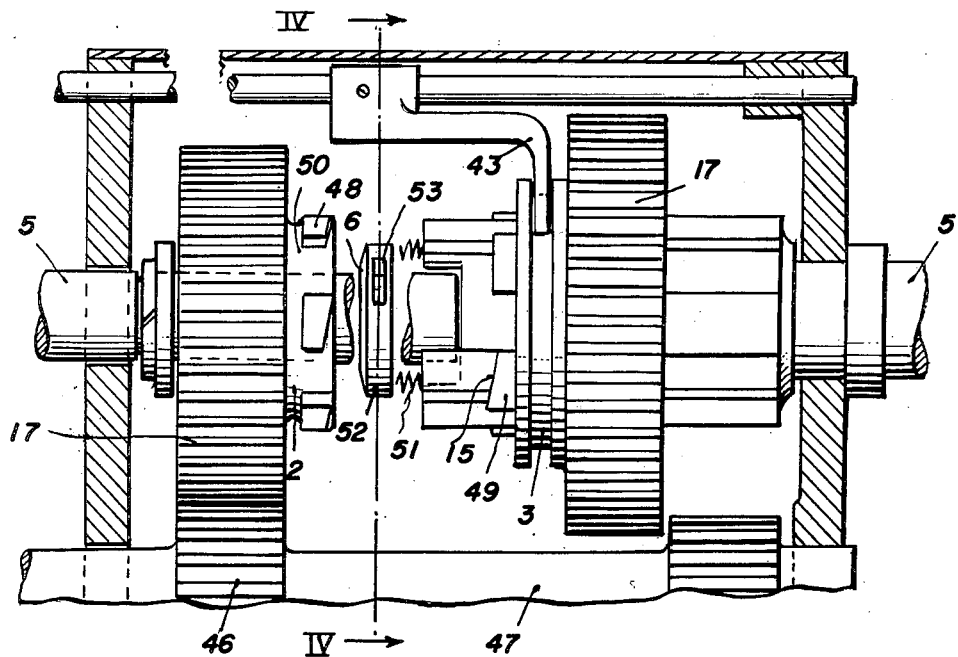
Fig. 3 is a side elevation, partly broken away and partly exploded, of a portion of the transmission, several parts being omitted in order to illustrate the mutual arrangement of other parts.
Figure 4:
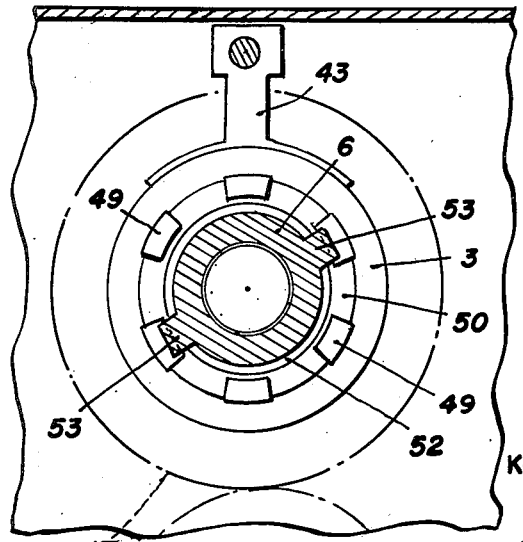
Fig. 4 is a section along lines IV—IV in Fig. 3.

The transmission 4 is of the substantially well-known type comprising dog clutches 1 arranged between the various speed gears and one member 2 of which is formed integral with the respective gear wheels, such as 17, freely rotatable on the main or output shaft 5, and the other member 3 of which is, by means of the gearshift-lever 12 and a gearshift-fork 43, axially displaceable along splines or the like on said output shaft 5 into and out of engagement with the corresponding dog clutch member 2 in order to connect the output shaft 5 to or disconnect the same from the input shaft 7, either directly or via the corresponding counter gears 44, 45, 46 on the countershaft 41. The construction of the dog clutch is clearly shown in Figs. 3 and 4. For the sake of simplicity the two dog clutch members 2 and 3 are shown as having only few teeth or dogs, which for member 2 are illustrated at 48 and for member 3 at 49, the corresponding recesses in the two members being shown at 50. Between the two members 2 and 3 there is inserted a thrust member in the form of a sleeve, disc or ring 6 which is mounted on the main shaft in such a manner as to be freely rotatable thereon and to be nested with member 3, said thrust member being, preferably resiliently by compression coil spring 51, gently urged against the adjacent face of member 2, the faces of said thrust member 6 being formed for transmitting axial thrust in order to obtain a minimum of frictional work which should be slightly greater on the input face of said thrust member 6. Thus the thrust member or ring 6 is not intended to transmit any braking or accelerating torque but simply to be rotated with and by the clutch member 2 into certain limits or intermediate positions relative to the clutch member 3. The thrust member or ring 6 is provided with a number of projections 53 angularly movable within limited recesses 52 in the output shaft 5, which projections when said ring 6 is in a certain limit position permit the dog clutch member 3 to be moved into engagement with the clutch member 2 when the clutch members rotate at the same speed, whereas at least when the speed of the clutch member 3 mounted on the output shaft 5 of the transmission is greater than the speed of the other clutch member 2, i. e. in changing down, the engagement of the dog clutch members 2, 3 is prevented by said ring 6 in that the latter has then been rotated into such a limit position that its projections 53 are aligned with clutch teeth 49 on member 3.

When the gear rotating with the input shaft 7, e. g. 17, and its dog clutch member 2 rotate at a greater speed than the clutch member 3 rotating with the output shaft 5, which is normally the case when changing into a higher speed, the gear 17 and its associated masses are to be retarded in order to obtain synchronism. This may be effected in various ways, for instance by connecting the gear 17, through shaft 7 and, as the case may be, through two countergears 46, 44, to the engine crankshaft 42 via the main clutch 11 which is operated by the clutch pedal 13 or by a special auxiliary clutch (14, Fig. 5), and thus retarding the same together with the engine, or in any suitable other manner. In order to cause a certain amount of retardation to be obtained and thus facilitate a synchromesh engagement of dog clutch 1 in conjunction with declutching and shifting the gear, therefore, the clutch teeth 48, 49, or some of them, may for instance in a manner well-known to the art be peripherally chamfered on those surfaces 15 which will meet when the clutch members are moved toward and against each other, so that they will slip until exactly synchronous speeds are obtained at the point of engagement.

However, in changing from a higher into a lower speed, the gear 17 and its associated clutch member 2 will have to be accelerated, since in this instance the output shaft 5 and hence the clutch member 3 will rotate at a greater speed than the input shaft 7 and the first-mentioned clutch member 2. This is effected by means of the engine in that, by means to be described further below, the fuel supply to the engine will be increased after the engine clutch 11 having been occasionally engaged. Such an increase of the fuel supply, for reasons hereinbefore discussed, should be controlled automatically, which is of particular importance if the operator has not been able to determine whether the engine should be retarded or accelerated, or how great the speed changes should be in order to enable the engagement of the new gear.

For this purpose, the arrangement according to Figs. 1 and 2 comprises supplementary or auxiliary actuating means 10 for the engine accelerating means, said actuating means 10 being arranged upon changing into a lower gear to cooperate with the gearshift mechanism 8 and engine clutch mechanism 9 in such a manner that, after the engine clutch 11 having been disengaged in conjunction with placing the gear-shift-lever 12 in neutral and then having again been occasionally engaged by releasing the clutch pedal, the engine will be accelerated through the action of moving the gear-shift-lever toward the new gear position, until equal speeds of the dog clutch members 2 and 3 will have been obtained, in which condition the thrust member or ring 6 will have been rotated into the limit, in which said dog clutch members may be engaged, i. e. the lower gear synchronously engaged. The ring or thrust member 6 acts as a reaction bearing member against the operating force applied to the gear shift lever 12. Upon synchronous speeds being attained this reaction bearing member will be disabled in its reactive function whereby the vehicle operator will obtain, at the proper instant, an indication to complete the gearshifting operation by pushing home the gearshift-lever, after the engine clutch has been disengaged, either by foot operating the same or automatically by means to be described further below.

In the embodiment shown in Figs. 1 and 2 the auxiliary actuating means 10 for the engine accelerating means comprises movement transmitting means which include two parts, viz. a body 19 reciprocable in guides provided in the cover 18 of the transmission 4, and a latch or locking rod 20 reciprocable perpendicularly to the movement of said body 19. The body 19 forms a bearing and support for the gearshift lever 12, and two oppositely acting compression coil springs 35, 36 urge the body 19 into a central or equilibrium position in which the upper end of said latch or locking rod 20, which end is formed as a cam-follower, engages into a corresponding cam-slot in the lower surface of said body 19.

The lower end of rod 20 is rounded and rests on a short lever 21 rigidly connected to a pivot 54 which is passed through the wall of the transmission case 4 projecting outside the same, the projecting portion thereof being provided with a relatively longer lever 22 the free end of which is connected to the engine accelerating means in any suitable manner, such as by a wire or rod 23.

The auxiliary actuating means 10 further comprise a linkage cooperating with the clutch mechanism 9 and gear-shifting mechanism, in the actual case with the lever 22 indirectly actuated by the gearshift-lever, said linkage consisting of a double-armed lever 25 and two link rods 24, 26 articulated thereto, and also of a lever 55 secured on the pivot of the throwout fork 28. In this linkage there is always a play which is formed mainly by the usual play or lost motion between the throwout fork 28 and the throwout bearing 29. The double-armed lever 25 is pivotally connected at point 30 to a lever 56 integral with the clutch pedal 13. One link rod 26 connects the lower end 31 of lever 25 with the free end of lever 55 on the pivot of the throwout fork 28. The other link rod 24 connects the upper end 32 of lever 25 with an attachment 33 which is secured on lever 22 at a suitable distance from its pivot 54, and through which attachment 33 the end of said link rod 24 freely passes and is provided with a stop nut or the like which rests against the attachment 33 when the body 19 is in its neutral position and the clutch pedal 13 is in its unoperated position (engine clutch engaged).

Upon changing from a higher into a lower gear the arrangement hereinbefore described will operate in the following manner: When the clutch pedal 13 is depressed in conjunction with placing the gearshift-lever 12 in neutral, the operating force is transmitted from the clutch pedal 13 through lever 56, lever 30—31, rod 26, and lever 55 to the throwout fork 28, whereby the play 27 is eliminated and the clutch 11 is disengaged, whereupon the link rod 24 is pulled so that it will tend to rock the lever 22 and thus lever 21 which action, however, is prevented by the latch or locking rod 20 the upper end of which is pressed into the cam-slot 37 in the body 19. The attachment 33 thus acts as a fixed reaction thrust member for the power energized link and lever system. Thereafter the clutch pedal 13 is released for effecting the occasional engagement of clutch 11. Thereupon the link and lever system will be deenergized so that the throwout fork 28 will return into its position of rest whereby the play 27 is again introduced into the linkage 10. As thereafter the gearshift-lever 12 is moved toward the new gear position the body 19 will depress the latch or locking bar 20 in that cam-slot 37 will be pressed against the cam-follower surface of said rod, whereupon the body 19 can be moved in one direction or the other so that the body 19 together with said springs 35 and 36 will act as an energy storing device. Thus when the rod 20 is depressed it will act on the lever 21 so that pivot 54 is rotated causing lever 22 to be rocked and the accelerating means of the engine to be actuated through string or rod 23. This increases the speed of the engine and thus that of the input shaft 7 and of the dog clutch member 2 rotating therewith, until said speed will be equalized with the speed of the output shaft 5 and thus with the speed of the dog clutch member 3. When lever 12 is pivoted about its ball and socket support in unit 18, the resistance of the slidable shift yokes 43 due to the blocking action of element 6 results in the lever 12 being pivotally moved about its connection 8 with the shift yokes 43, thus causing the yieldable pivot support members 19 to slide in unit 18 against the action of springs 35 or 36 with a consequent storing of energy which is sufficient to complete the gear shifting operation when elements 6 are correctly positioned for clutch engagement. The operator will now be enabled to move his gearshift-lever into the new gear position during which the operator, of course, as usual will declutch by depressing the clutch pedal 13 causing the linkage to be energized again and the body 19 to be forced back into neutral.

Figure 5:
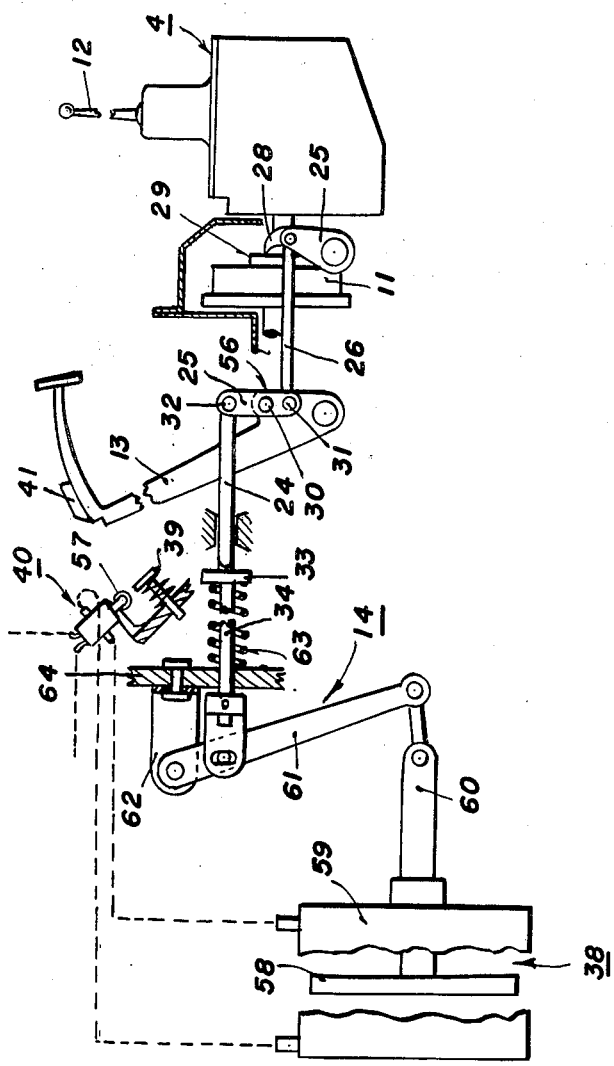
Fig. 5 is a diagrammatic side elevation of another embodiment of the synchronizing device having a modified arrangement for actuating the engine accelerating means upon changing down, and also a special auxiliary clutch for the occasional engagement of the main clutch before actuating the accelerator.

The modified arrangement shown in Fig. 5 differs from the preceding embodiment mainly in that, instead of through double declutching, the occasional engagement of the engine clutch 11 in conjunction with changing from a higher into a lower gear is carried out by auxiliary means 14 for operating the main clutch 11 normally operated by means of the engine clutch pedal 13, and that, during the occasional engagement of the engine clutch, the engine accelerating means is actuated by the clutch pedal 13 instead of by the gearshift-lever 12.

The clutch members of the auxiliary means 14 for operating the main clutch 11 are constituted by the clutch members of the engine main clutch 11 proper, i. e. by the engine flywheel and a clutch disc cooperating therewith, whilst the actuating means for said auxiliary means 14 is formed by a hydraulic cylinder and piston arrangement 38. The latter is operated by, for instance, a two-way valve 40 the actuating member 57 of which projects into the path of movement of a cam member 41 arranged on the clutch pedal 13, and in such a position that the valve 40 will be shifted when, after having been depressed into its declutching position, the clutch pedal 13 is depressed slightly further. Upon shifting the valve 40, the piston 58 is displaced in the cylinder 59, and a piston rod 60 connected to the piston operates one end of a double armed lever 61 the opposite end of which is pivoted on a fixed support or bracket 62. A reciprocably guided push and pull rod 34 is pivotally connected to lever 51 at a relatively short distance from the support 62 and passes horizontally through a fixed plate or the like 64, the free end of said rod being provided with a collar 33. Between the collar 33 and the fixed plate 64 there is inserted a compression coil-spring 63 around rod 34.

In a manner similar to that of the preceding embodiment, a link and lever system is provided comprising a double-armed lever 25 which is pivoted in a point 30 to a lever 56 integral with the clutch pedal 13. The lower end 31 of lever 25 is, as before, connected through a link rod 26 to a lever 55 secured on the pivot of the throwout fork 28. The upper end 32 of lever 25 is also, as before, arranged to cooperate through a link 24 with a reaction bearing member which is movable, and which in this instance is formed by the collar 33 on the spring biased push and pull rod 34.

An actuating member in the form of a spring biased push rod 39 is connected to the engine accelerating means and is arranged in such a position, for instance in the toe board of the vehicle, that it may be operated by the clutch pedal after the latter has been depressed beyond the position in which the valve 40 has been shifted.

The operation of the arrangement described is as follows:

When changing from a lower into a higher speed gear the gearshifting operation runs in the normal way, i. e. the clutch pedal 13 is depressed, but not to a sufficient extent to cause shifting of valve 40. Upon so doing the operating force is transmitted through lever 56, lever 30—31, link rod 26 and lever 55 to the throwout fork 28 which actuates the throwout bearing 29 so that the engine clutch 11 is disengaged. The operating force is, of course, transmitted also through lever 30—32 and link rod 24 so that the latter is pressed against the collar 33 but is not capable of overcoming the tension of the spring 63. During this operation the gearshift-lever 12 is first placed in neutral and is then moved into the new gear position, after the input shaft 7 of the transmission and the masses associated therewith having been retarded to a speed equal to that of the output shaft 5, due to the resistance present in the mechanisms and the retarding means of the dog clutch 1, and, as the case may be, in conjunction with engagement of the auxiliary clutch 14.

When changing from a higher into a lower speed gear clutch pedal 13 is depressed into its disengagement position, and in conjunction therewith gearshift-lever 12 is placed in neutral. Thereafter the clutch pedal is further depressed so that its cam member 41 will shift the actuating member 57 of the two-way valve 40. Upon doing this pressure fluid will be supplied to the hydraulic cylinder 59 and move the piston 58 in such a direction that the latter will move its piston rod 60 to the left in Fig. 5. This will rock the lever 61 in such a direction that the push and pull rod 34 will be pulled to the left according to the figure against the action of spring 63. The collar 33 which has up till now acted as a reaction member or stop against the operating force exerted on the clutch pedal, thus will be pushed to the left. This releases the tension of the clutch springs in engine clutch 11 through the link rods 24 and 26 and lever 25, so that the throwout bearing 29 will be moved to the right as seen in the figure and the engine clutch will be engaged. Then the clutch pedal 13 is further depressed while the engine clutch 11 is thus engaged. This actuates the engine accelerating means 39 causing the engine and thus the dog clutch member 2 at the point of engagement in the transmission 4 to be accelerated until synchronous speeds of the same and the other dog clutch member 3 are obtained, the ring or thrust member 6 having then been rotated into such a limit that the dog clutch can be engaged by moving the gear-shift lever into the new speed gear position, in conjunction with which operation the clutch pedal 13 is released, whereby the same will first cease to actuate the accelerating means 39 and then shift back the valve 40 so that the pressure supply to the piston 59 is interrupted and the spring 63 will be able to return the push and pull rod 34 with its collar or reaction member 33 into their normal position.

It will be understood that the invention can be modified in various respects without departing from its spirit. Thus, for example, servo mechanism may be arranged so as to actuate the linkage or the clutch pedal occasionally after the transmission being placed in neutral in order to accelerate the clutching operation, or to indicate the shafts. With the embodiments described it will be possible under all conditions to shift gears when the engine is running. Sometimes it may be required, however, to be able to start the engine by letting the vehicle roll down a hill or otherwise, with the direct gear engaged, if, for instance, the starter is inoperative. In such a case the thrust member 6 cooperating with this gear will have to be slightly modified or to be associated with some simple accessory of a nature such that said thrust member will not under such circumstances prevent the engagement of the direct gear. The above-mentioned and other modifications of the invention, however, are of a nature to be readily obvious to anyone skilled in the art.

Having now particularly described and ascertained the nature of my said invention and in what manner the same is to be performed, what I claim is:

1. A synchronizing device for engaging various gears in constant-mesh gear transmissions in motor vehicles having an input shaft, an output shaft and speed gears associated therewith irrespective of whether, at the beginning of the shifting operation, the engine driven input shaft and its associated gears in the transmission case rotate at a lower or higher speed than the output or main shaft, at the intended point of engagement between the two shafts, comprising dog clutch members forming dog clutch means arranged between the respective speed gears of the transmission and capable of engagement only when the clutch members thereof rotate at the same speed, a thrust member preventing engagement of said clutch members when the speed of the clutch member associated with the output shaft of the transmission is greater than the speed of the other clutch member, the angular position of said thrust member relative to one of said clutch members being dependent on the sense of rotation of the input shaft of the transmission relative to the output shaft thereof, gear shifting means comprising a movably supported gearshift lever adapted when operated to cause displacement of one of said dog clutch members to engage or disengage the dog clutch means, engine clutch means operable to engaged condition and disengaged condition to connect and disconnect the engine of said vehicle to and from said input shaft, respectively, accelerating means for said engine, main actuating means for said accelerating means, auxiliary actuating means for said accelerating means of said engine operably connected between said gear shifting means and said engine clutch means and adapted, when said engine clutch is engaged, to actuate said accelerating means in a throttle opening direction upon operation of said gearshift lever, and when said engine clutch is disengaged in a throttle closing direction, whereby, when said engine clutch is engaged and said gearshift lever is operated to engage said dog clutch members in said transmission with said thrust member in its blocking position, said engine is accelerated by said auxiliary means actuating said accelerating means until synchronous speeds are obtained at said point of engagement in said transmission, after which said auxiliary actuating means in a throttle closing direction through disengagement of said engine clutch in conjunction with termination of said gear shifting operation.

2. A synchronizing device as claimed in claim 1, in which said thrust member, upon changing from a lower into a higher gear, occupies a position allowing engagement of said dog clutch members, damping means for said dog clutch members for retarding the dog clutch member rotating with said input shaft and the masses associated therewith into a speed which is equal to that of the other dog clutch member.

3. A synchronizing device as claimed in claim 2 in which said thrust member comprises a thrust-washer for the respective speed-gears on said output shaft, said washer being shaped and adapted to serve as the said thrust member.

4. A synchronizing device as claimed in claim 1, said auxiliary actuating means for said engine accelerating means being adapted, when said engine clutch is engaged, to actuate said engine accelerating means by the action of said gearshift lever being manually operated and comprising two-part movement transmitting means normally biassed for immovable connection with each other, and an operating member for said engine accelerating means operably connected to said transmitting means and said engine accelerating means in such a manner that said movement of said gearshift lever is transmitted to said accelerating means to render the latter active.

5. A synchronizing device as claimed in claim 1, said auxiliary actuating means for said engine accelerating means being adapted, when said engine clutch is disengaged, to render inactive said actuation of said accelerating means and comprising a linkage connected to said engine clutch means and said gear shifting means, said linkage being operable in response to the disengaging movement of said engine clutch means to block said movable support for said gearshift lever, play being normally present in said linkage when said engine clutch is engaged, said play being eliminated by movement of said auxiliary means for actuating said engine accelerating means through operation of said gearshift lever, or by renewed engine clutch disengagement movement, said movement being transmitted to said engine accelerating means whereby, upon changing down gears, said engine will be accelerated until synchronous speeds are attained at the intended point of engagement in said transmission.

6. A synchronizing device as claimed in claim 5, said engine clutch means comprising a clutch pedal for operating said engine clutch means, said auxiliary means for actuating said engine accelerating means comprising a linkage connected to said engine clutch means and said gearshifting means so as to enable disengagement of said engine clutch means upon operation of said gearshift lever, said engine clutch means comprising a throwout fork and a throwout bearing, said throwout bearing being adapted for axially transmitting the clutch pedal pressure against the action of the clutch engagement pressure, and vice versa, upon operation and release, respectively, of said clutch pedal, said play being normally present between said throwout fork and said throwout bearing when said clutch is engaged and being completely eliminated when said clutch is disengaged.

7. A synchronizing device as claimed in claim 6, said linkage comprising a double-armed lever pivoted at a point intermediate its ends to said engine clutch operating pedal, a rod adapted to transmit the movement of said clutch operating pedal to said throwout fork, said lever being at one end pivotally connected to said rod, a second rod pivotally connected to the other end of said lever, and a movable reaction support formed by a movable member associated with said gear shifting means operable by said lever through said second rod.

8. A synchronizing device as claimed in claim 7, said movable reaction support comprising energy storing means operable by said gear shifting means and situated in said gear shifting mechanism between the movable dog clutch member and said gear shifting means, retaining means locking said energy storing means in a position of equilibrium when said engine clutch means is disengaged, said retaining means being adapted, when said engine clutch is engaged and the engagement of said dog clutch is prevented by said thrust member, to release said energy storing means whereby, through the action of moving said gear shifting means for a desired gear position, said energy storing means is displaced while storing energy through said gear shifting means to an extent corresponding to said play, to thereby cause actuation of said engine accelerating means until synchronous speeds are attained at said point of engagement in said transmission, whereby upon disengagement of said engine clutch in conjunction with terminating the gear shifting operation said movable support will, in dependence of the inactivating function of said auxiliary actuating means and said energy storing means, be returned into its immovable position.

KARL GUSTAF EUGEN WICKBERG.

REFERENCES CITED

The following references are of record in the file of this patent:

UNITED STATES PATENTS

| Number | Name | Date |
|---|---|---|
| 1,665,825 | Stevens | Apr. 10, 1928 |
| 1,693,645 | Fahrney | Dec. 4, 1928 |
| 1,895,722 | McLearn | Jan. 31, 1933 |
| 1,955,845 | Bush | Apr. 24, 1934 |
| 2,102,755 | Sinclair | Dec. 21, 1937 |

FOREIGN PATENTS

| Number | Country | Date |
|---|---|---|
| 629,467 | France | Nov. 10, 1927 |